April 24, 1928.
T. MARIOTTI
1,667,599
SURVEYING INSTRUMENT
Filed April 21, 1926
6 Sheets-Sheet 4
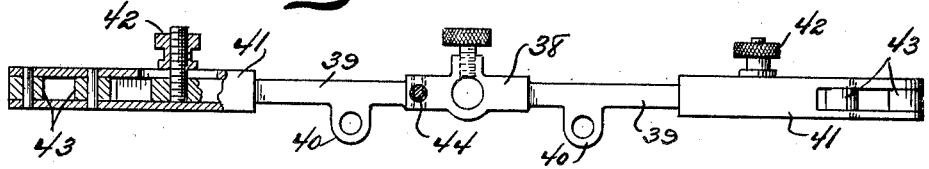
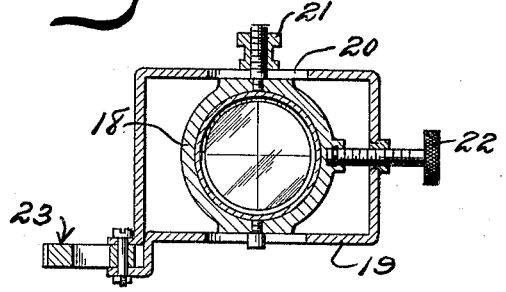
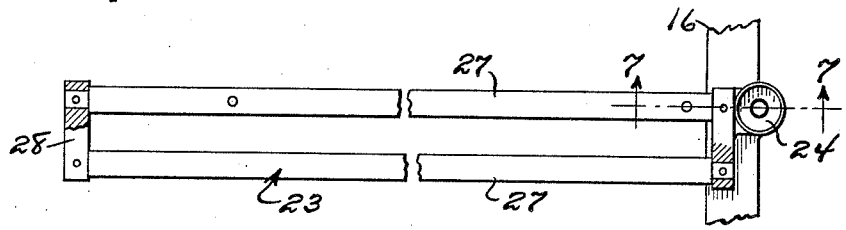
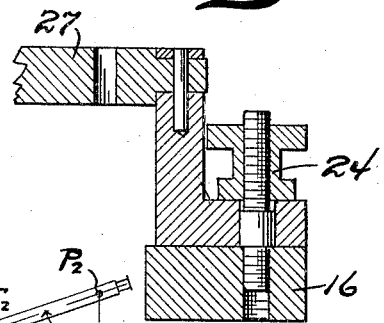
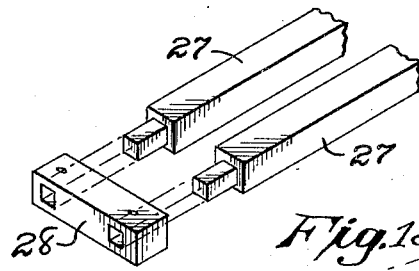
Tony Mariotti
INVENTOR
BY Victor J. Evans
ATTORNEY April 24, 1928.
T. MARIOTTI
1,667,599
SURVEYING INSTRUMENT
Filed April 21, 1926
6 Sheets-Sheet 5
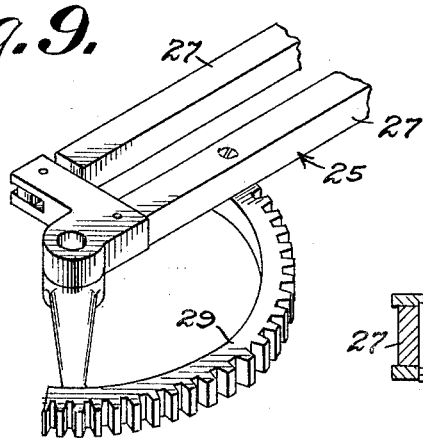
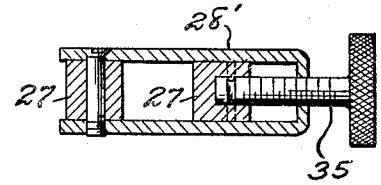
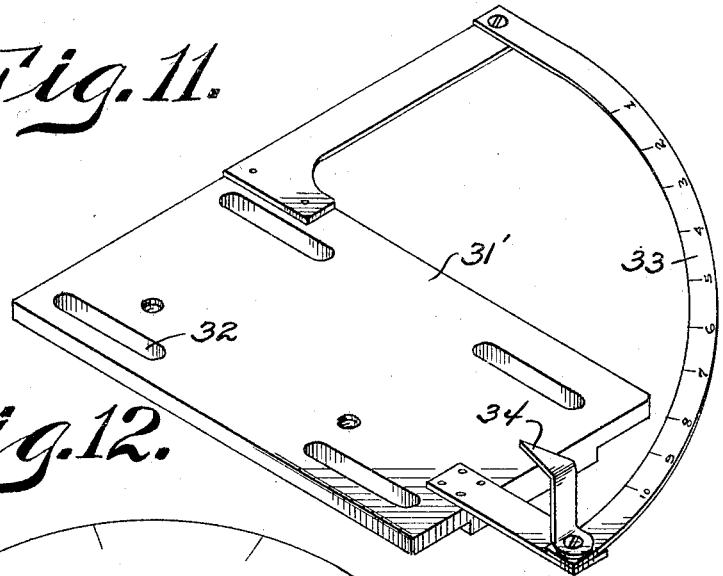
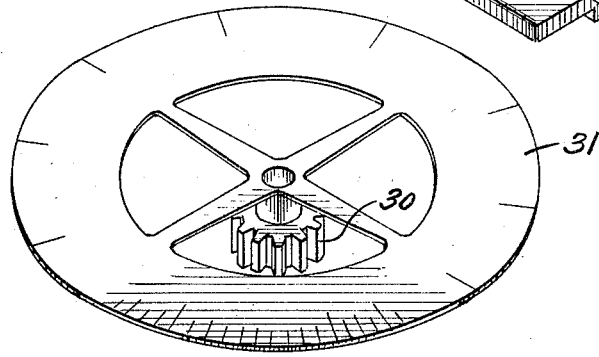
Tony Mariotti
INVENTOR
BY Victor J. Evans
ATTORNEY
WITNESS: John Donovan April 24, 1928.
T. MARIOTTI
1,667,599
SURVEYING INSTRUMENT
Filed April 21, 1926
6 Sheets-Sheet 6
Fig. 13.
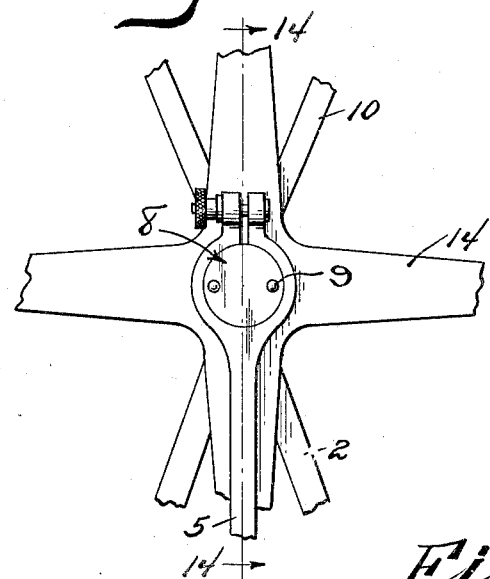
Fig. 14.
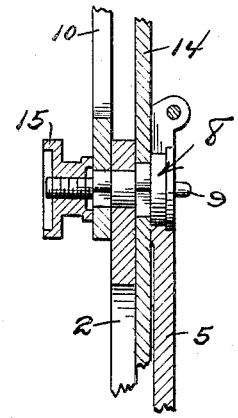
Fig. 15.
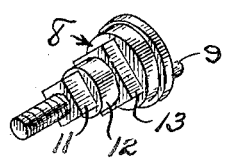
Fig. 16.
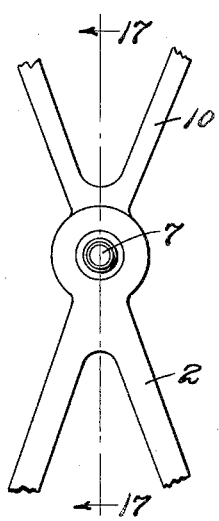
Fig. 17.
Tony Mariotti
INVENTOR
BY Victor J. Evans
ATTORNEY
WITNESS: John Donovan Patented Apr. 24, 1928.

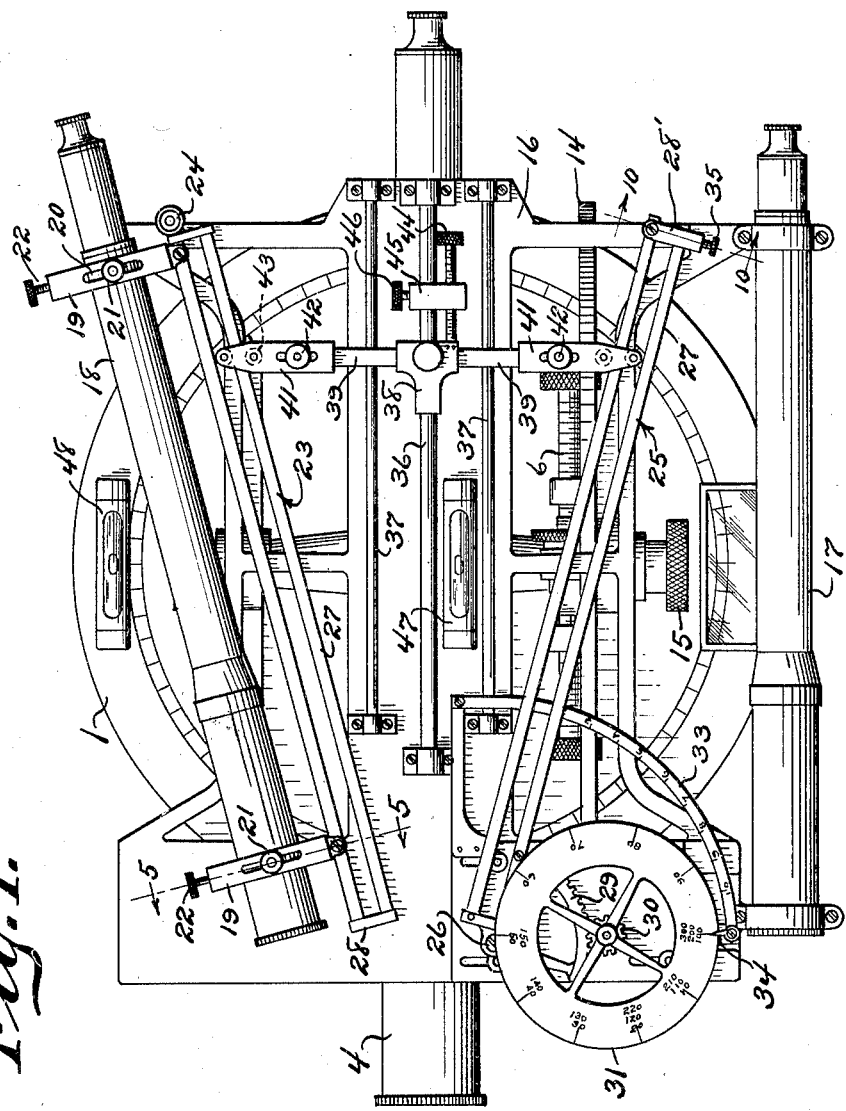

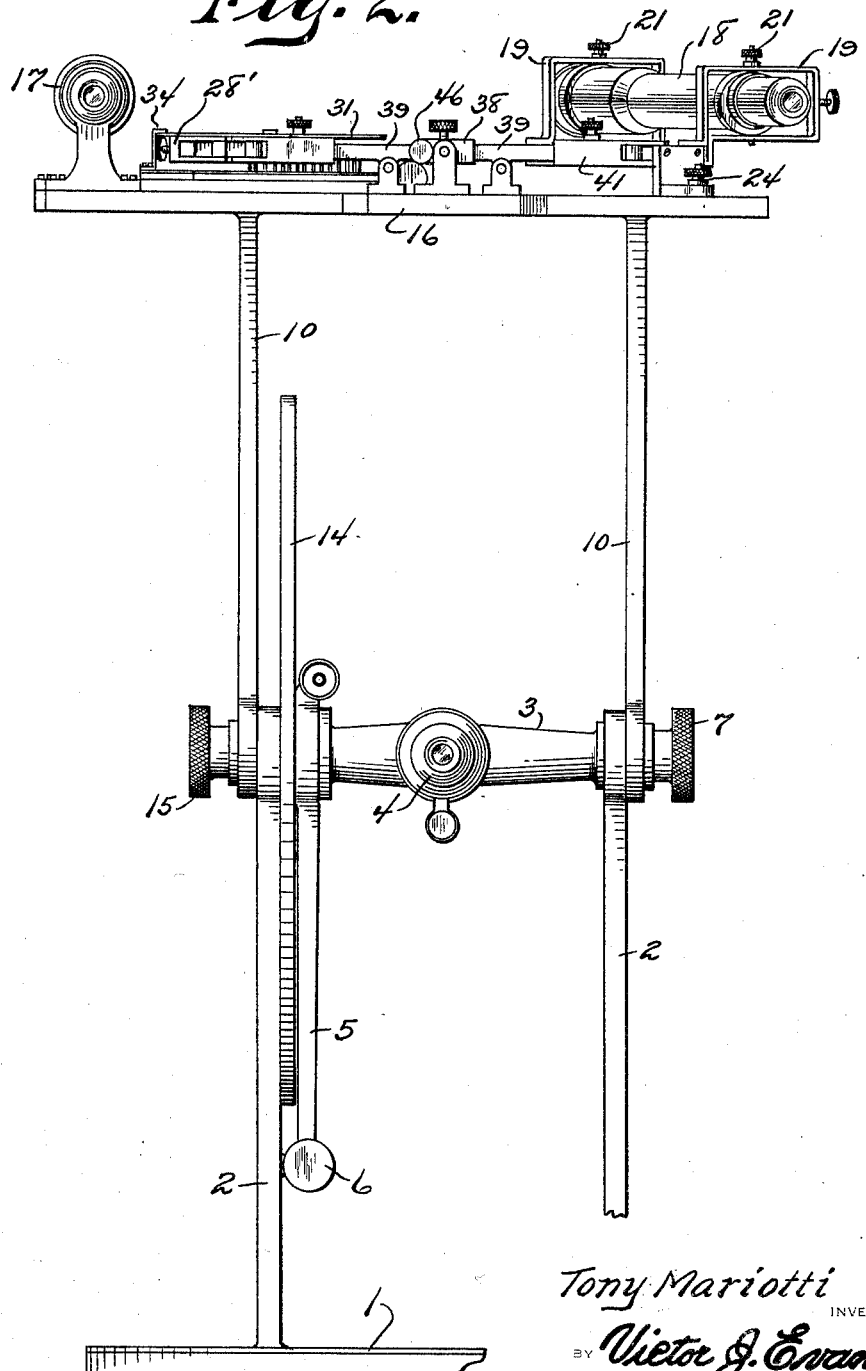

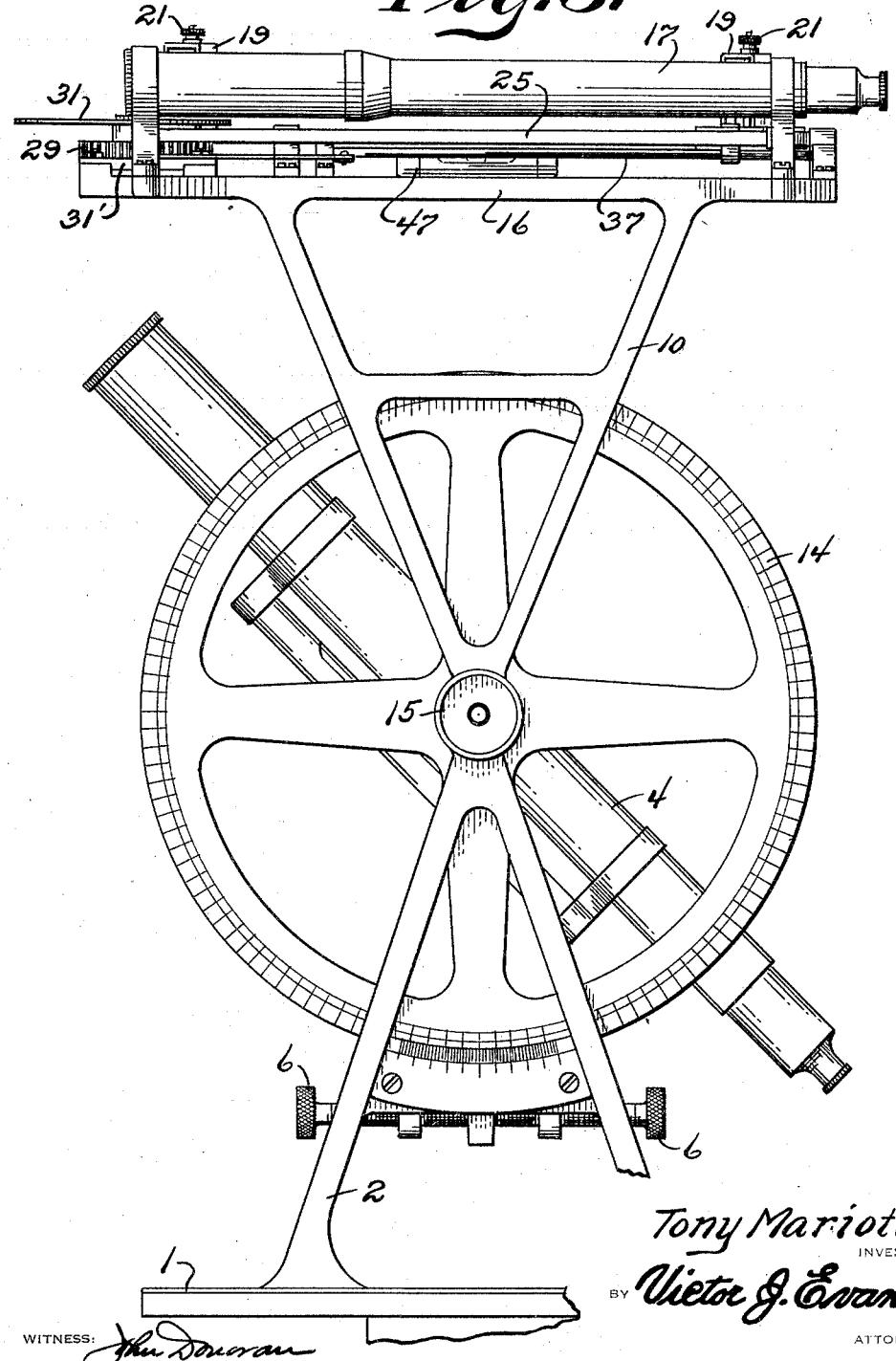

1,667,599

UNITED STATES PATENT OFFICE.

TONY MARIOTTI, OF LORAIN, OHIO.

SURVEYING INSTRUMENT.

Application filed April 21, 1926. Serial No. 103,544.

This invention relates to a surveying device, the general object of the invention being to provide means for measuring horizontal distances by the use of two or more telescopes and indicating means, with means for operating the indicating means by the movement of one telescope in the focussing of such telescope on an object on which another telescope has been focussed.

Another object of the invention is to provide means for attaching the device to the horizontal axis of a transit so that the device can be used in conjunction with the transit.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the device attached to a transit.

Figure 2 is a rear view of Figure 1.

Figure 3 is a side view of Figure 1.

Figure 4 is a view, with parts in section, of the sliding member and its adjustable end parts.

Figure 5 is a section on line 5—5 of Figure 1.

Figure 6 is a view of one of the pivoted frames for a telescope.

Figure 7 is a section on line 7—7 of Figure 6.

Figure 8 is a view showing how an end piece is attached to the side pieces of one of the telescopic supporting members.

Figure 9 is a perspective view of the toothed segment and the telescopic supporting member to which it is attached.

Figure 10 is a section on line 10—10 of Figure 1.

Figure 11 is a view of the dial carrying plate.

Figure 12 is a view of the circular dial and its pinion.

Figure 13 is a fragmentary view of the means for connecting one side of a transit support to the device.

Figure 14 is a section on line 14—14 of Figure 13.

Figure 15 is a perspective view of the connecting bolt.

Figure 16 is a view of the opposite side of the connecting means.

Figure 17 is a section on line 17—17 of Figure 16.

Figure 18 is a diagrammatic view showing how the device is used.

In these views, 1 indicates the table of the transit and 2 the uprights thereon for supporting the hub 3 of the telescope 4. This hub is provided with the depending arm 5 which is engaged by the adjusting screws 6 for adjusting the telescope in the usual manner. As these parts are of well known construction, they will not be described in detail.

In carrying out my invention, I detachably mount the hub 3 in the uprights 2 through means of a set screw 7 rotatably mounted in one of the legs 2 and engaging a threaded hole in one end of the hub and a bolt 8 which is mounted in the other upright and has pins 9 thereon for engaging holes in the opposite end of the hub. Thus by unscrewing the set screw 7 from the end of the hub and tilting the hub, the opposite end of the hub can be freed from the pins 9. The device forming the subject matter of the invention, is detachably connected with the upper ends of the uprights 2 by these members 7 and 8, as one of the uprights 10 is held against an upright 2 by the bolts 7, as shown in Figure 17, while the other upright 10 is supported by a square part 11 of the bolt 8, this bolt having a rounded part 12 which engages the upright 2 so that the bolt can rotate in the upright and a square part 13 for receiving the wheel 14 of the transit so that the wheel must rotate with the bolt. The arm 5 is clamped to the enlarged head of the bolt. A nut 15, engaging the threaded end of the bolt, holds the parts assembled and by tightening the two set screws, the uprights 10 will be held in adjusted position on the transit.

A horizontal frame 16 is connected with the upper ends of the uprights 10 and a stationary telescope 17 is supported at one side of said frame. A second telescope 18 is adjustably arranged in a pair of yokes 19 through means of the slots 20 in the yokes receiving the set screws 21 carried by the telescope, the telescope being set in adjusted position by a set screw 22 carried by each yoke. These yokes are fastened to a small elongated frame or supporting member 23 which is pivoted at its front end to the main frame, as shown at 24. A similar frame or supporting member 25 is pivoted at its rear end to the frame 16, as shown at 26, each of these frames consisting of a pair of long bars 27 connected together in spaced relation by the end pieces 28, the end pieces being connected to the bars, as shown in Figure 8.

The pivotal end of the frame 25 carries a toothed segment 29 which meshes with a pinion 30 on a disk-like dial member 31 which is rotatably supported on a plate 31' to which the pivot 26 is attached. This plate is adjustably connected with the frame 16 through the pin and slot connections shown generally at 32 and carries an arc-shaped scale 33 which cooperates with one of the long bars 27 of the member 25. A pointer 34 is located at one end of the scale 33 and cooperates with the dial 31. The bar 27 of the frame 25 which cooperates with the scale 33 is adjustable in its end piece through means of the set screw 35 in the end piece 28' which is of yoke shape and receives the end of said piece 27.

A guide rod 36 is supported in spaced relation on the frame 16 and similar rods 37 are arranged one on each side of said rod 36. A member 38 is slidably arranged on the rod 36 and has an arm 39 connected with each side thereof, these arms having depending perforated ears 40 for engaging the rods 37. A casing 41 is adjustably connected with the outer end of each arm 39 by the slot and set screw connection 42 and each casing carries a pair of pulleys 43 which engage the inner rod of each of the frames 23 and 25. Thus as the member 38 and its arms 39 are moved on the frame, the members 23 and 25 will be moved toward or from each other, according to the direction of movement of the member 38 and this movement of the frame 25 will rotate the dial 31 through the segment 29 and the pinion 30, and the frame 25 will also pass over the scale 33, the parts being so arranged that for each rotation of the dial 31, the outer bar 27 of the frame 25 will move to a new figure on the scale so that this bar and the scale will indicate the number of rotations made by the dial 31 during the movement of the parts. The adjustments mentioned will permit the parts to be properly set so that they will cooperate with each other in the proper manner. It will also be seen that as the frame 23 moves, the telescope 18 will also be moved and thus the movement of said telescope 18 to focus it on an object will operate the indicating mechanism composed of the dial and scale, before described, and such means are so arranged that they will indicate the distance between a point on which the device sets and a point on which the telescopes 17 and 18 are focussed.

The member 38 is moved by hand to the approximate position to focus the telescope 18 and then the rest of the movement is made by the set screw 44 which passes through a threaded hole in a block 45 carried by the bar 36, with the end of the screw 44 fastened to the member 38. The block 45 is held in adjusted position on the bar 36 by the set screw 46. This arrangement permits a fine adjustment of the member 38 for the final focussing of the telescope 18.

The frame 16 is provided with a spirit level 47 and one of the levels on the table 1 is shown at 48.

With this device, the horizontal distance between two points can be readily ascertained by simply focussing the two telescopes 17 and 18 on an object, the indicating mechanism giving the distance according to the amount of movement of the telescope 18. The attachment can be easily and quickly attached to a transit and it is adjusted with the transit.

This instrument may be used either in preliminary or location surveys, and is especially valuable for the plotting of contour maps.

The operation of the device is based on the fundamental formulæ of trigonometry, as illustrated diagrammatically in Figure 18.

Referring to this figure, $T_1$ is the stationary telescope and $T_2$ is the adjustable telescope which pivots at the point $P_2$. S is the object or mark sighted by the observer. Considering that the distance $P_1P_2$ is the constant of the instrument, the following formulæ are evolved:

(1) $\alpha + B = 90°$.
(2) $SP_1 = SP_2 \cos \alpha = SP_2 \sin B$.
(3) $P_1P_2 = SP_2 \sin \alpha = SP_2 \cos B$.
(4) Dividing (2) by (3).

$$\frac{SP_1}{P_1P_2} = \frac{SP_2 \sin B}{SP_2 \cos B} = \tan B.$$

(5) $SP_1 = P_1P_2 \tan B$.

Since $P_1P_2$ is a constant of the instrument and angle B is determined by the instrument, it is manifestly easy to see that distances may be properly graduated on the dial and arc-shaped scales in accordance with the last of the formulæ indicated above.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An instrument of the class described comprising a supporting frame, a telscope connected with one side of the frame, an elongated frame pivotally supported at its front end to the main frame, a telescope carried by said elongated frame, a second elongated frame pivotally connected with the main frame at its rear end, indicating mechanism operated by the movement of the second elongated frame, a sliding member supported on the main frame and movably connected with the elongated frames so that movement of the sliding member will actuate the elongated frames and means for securing fine adjustment of the sliding member after the same has been moved by hand.

2. An instrument of the class described comprising a supporting frame, a telescope supported at one side of the frame, an elongated frame having its front end pivotally connected with the main frame, a telescope adjustably connected with the elongated frame, a second elongated frame having its rear end pivotally connected with the main frame, manually operated means for moving the frames in unison, a rotary dial, means for rotating the same by the movement of the second elongated frame and a pointer associated with the dial.

3. An instrument of the class described comprising a supporting frame, a telescope supported at one side of the frame, an elongated frame having its front end pivotally connected with the main frame, a telescope adjustably connected with the elongated frame, a second elongated frame having its rear end pivotally connected with the main frame, manually operated means for moving the frames in unison, a rotary dial, means for rotating the same by the movement of the second elongated frame, a pointer associated with the dial, a scale over which a part of the second elongated frame passes for indicating the number of rotations made by the rotary dial and means for adjusting said part of the elongated frame.

In testimony whereof I affix my signature.

TONY MARIOTTI.